UNITED STATES PATENT OFFICE.

ERIK W. ENEQUIST, OF BROOKLYN, NEW YORK.

OIL AND PIGMENT.

1,009,708.  Specification of Letters Patent.  Patented Nov. 21, 1911.

No Drawing.  Application filed December 10, 1910.  Serial No. 596,663.

*To all whom it may concern:*

Be it known that I, ERIK W. ENEQUIST, a citizen of the United States, residing at Brooklyn, in the county of Kings and State of New York, have invented certain new and useful Improvements in Oils and Pigments, of which the following is a specification.

This invention relates to the production of an improved oil suitable for use as a pigment carrier or body for paint, and to the method of obtaining the same, and also to an improved pigment or color for paint, the object of the invention being to produce an improved oil which may be used in place of raw linseed oil and which when so used has certain advantages over such oil and will be very much less expensive to produce, and which may also be used as a waterproofing material or as a suitable covering to resist the action of alkalis and acids.

A further object of the invention is the provision of an improved pigment or color for use as a paint, and to the method of obtaining the same.

I have discovered that by certain treatment of a product obtained in the distillation of crude petroleum, usually called petroleum tailings or wax tailings, I am able to provide an improved oil adapted for use as a paint carrier, and also to produce an improved pigment adapted for use in forming paint.

In carrying out this improvement I dissolve about an equal quantity of such petroleum or wax tailings, while preferably in a melted condition as obtained from the still, or melted by reheating if it has been allowed to cool, in about the same quantity of a light hydrocarbon oil, such for instance as benzin or turpentine substitutes at about 64–60 degrees Bé. or 48–60 degrees Bé. respectively, or in a mixture of the two having a gravity varying from 64–48 degrees Bé., or in a solvent having a boiling point of 150 to 300 degrees Fahrenheit. The solution is then allowed to cool, or is artificially chilled, and settle, and when thoroughly settled a green phenol precipitate forms of the formula $C_{18}H_{13}O$. This green color or pigment is then treated with fresh hydrocarbon liquid and so washed out and purified, and when dried forms a green color or pigment for paint. The solution in which this green phenol precipitate forms, after settling for a certain period of time, usually several weeks, forms a clear oil or pigment carrier after it is separated from the precipitate, it having the color of boiled dark linseed oil, and has the quality of binding ordinary pigments, and by the addition of a suitable drier it will, together with such pigments as may be mixed therewith, dry hard upon the evaporation of the light hydrocarbon oil therein. This improved oil or pigment carrier, when dry, or even before it is dry, will withstand the action of alkalis, ammonia, dilute acids, water and atmospheric conditions, and therefore forms an exceedingly good waterproofing material, it being very much less expensive to produce than linseed oil, costing about one-sixth of the cost of linseed oil.

By this improved method of obtaining the oil it will be observed that I not only produce an oil much less expensive than linseed oil, and which will have greater resisting qualities than such oil, but at the same time obtain an improved pigment or color for use in paint.

I do not limit my invention to the solution of wax tailings in about an even quantity of light hydrocarbon oil, but I aim at the solution of the wax tailings in a petroleum solvent of a gravity from 64–48 degrees Bé. more or less, and having a boiling point of from 150 to 300 degrees Fahrenheit.

In the distillation of petroleum there are several different qualities of petroleum known, for instance the heavier California or Kansas oil on the one hand and the Pennsylvania oil on the other hand. The former are supposed not to be wholly oxidized, or unsaturated, while the Pennsylvania oil is known to be saturated petroleum.

In the distillation of petroleum the petroleum tailings is the last product that is obtained before the retort is "coked", and only about one-tenth of one per cent. of these tailings is obtained in the distillation. It will therefore appear that the unsaturated part of the petroleum is more concentrated in the tailings than in any other part, and therefore it will oxidize in the air with a drier just as rapidly as raw linseed oil. The name petroleum tailings, or wax tailings, is identified with the particular distillate above mentioned.

I claim as my invention:

1. The method of producing the oil herein described, which consists in dissolving a quantity of petroleum tailings in a quantity of a light hydrocarbon oil, and then permitting the same to settle.

2. The method of producing the oil herein described, which consists in dissolving a quantity of petroleum tailings in a quantity of a solvent having a boiling point of 150 to 300 degrees Fahrenheit, and then permitting the same to settle.

3. The method of producing the oil herein described, which consists in dissolving about an equal quantity of petroleum tailings in about the same quantity of a light hydrocarbon oil having a specific gravity of about 48–60 degrees Bé., and then permitting the same to settle.

4. The method of producing the oil herein described, which consists in dissolving a quantity of petroleum tailings in a quantity of a light hydrocarbon oil, and then permitting the same to settle and obtaining a pigment precipitate, and separating such precipitate from the oil.

5. The method of producing the oil herein described, which consists in dissolving a quantity of melted petroleum tailings in a quantity of a light hydrocarbon oil, then permitting the same to settle and obtaining a pigment precipitate, and then separating such precipitate from the oil.

6. The method of producing the oil herein described, which consists in dissolving about an equal quantity of melted petroleum tailings in about the same quantity of a light petroleum oil having a specific gravity of about 48–60 degrees Bé., then permitting the same to settle and obtaining a pigment precipitate, and then separating such precipitate from the oil.

7. The method of producing the oil herein described, which consists in dissolving a quantity of petroleum tailings in a quantity of a light hydrocarbon oil, then permitting the same to settle and obtaining a pigment precipitate, separating such precipitate from the oil, and then washing and purifying the precipitate.

8. The method of producing the oil herein described, which consists in dissolving about an equal quantity of melted petroleum tailings in about the same quantity of a light hydrocarbon oil having a specific gravity of about 48–60 degrees Bé., then permitting the same to settle and obtaining a pigment precipitate, separating such precipitate from the oil, and then washing and purifying the precipitate.

9. The method of producing the oil herein described, which consists in dissolving a quantity of petroleum tailings in a quantity of a light hydrocarbon oil, then permitting the same to settle and obtaining a pigment precipitate, separating such precipitate from the oil, then washing and purifying the precipitate by treating it with a fresh hydrocarbon liquid, and then permitting it to dry.

10. The method of producing the oil herein described, which consists in dissolving a quantity of melted petroleum tailings in a quantity of a light hydrocarbon oil, then permitting the same to settle and obtaining a pigment precipitate, separating such precipitate from the oil, and then washing and purifying the precipitate by treating it with a fresh hydrocarbon liquid.

11. The method of producing the oil herein described, which consists in dissolving a quantity of petroleum tailings in a petroleum solvent having a specific gravity of from 64 to 48 degrees Bé. and a boiling point of 150 to 300 degrees Fahrenheit.

12. An oil for the purpose stated, consisting of a settled oil obtained from the dissolution of a quantity of petroleum tailings in a solvent having a specific gravity of from 64 degrees to 48 degrees Bé. and a boiling point of 150 to 300 degrees Fahrenheit.

13. An oil for the purpose stated, consisting of a settled oil obtained from the dissolution of about an equal quantity of petroleum tailings in about the same quantity of a light hydrocarbon oil and separated from a pigment precipitate.

14. A green pigment for paints, consisting of a washed and purified precipitate obtained from the dissolution of a quantity of melted petroleum tailings in a quantity of a light hydrocarbon oil.

15. A green pigment for paints, consisting of a precipitate obtained from the dissolution of petroleum tailings in a quantity of hydrocarbon oil.

16. A green pigment for paints, consisting of a precipitate obtained from the dissolution of a quantity of petroleum tailings in a solvent.

Signed at 1822 Park Row Building, New York, N. Y., this 9th day of December, 1910.

ERIK W. ENEQUIST.

Witnesses:
F. E. BOYCE,
GEORGE A. PURCELL.